M. B. BULGER & J. P. OFFERMAN.
SNOW SCRAPER.
APPLICATION FILED MAY 1, 1916.
1,196,206.
Patented Aug. 29, 1916.
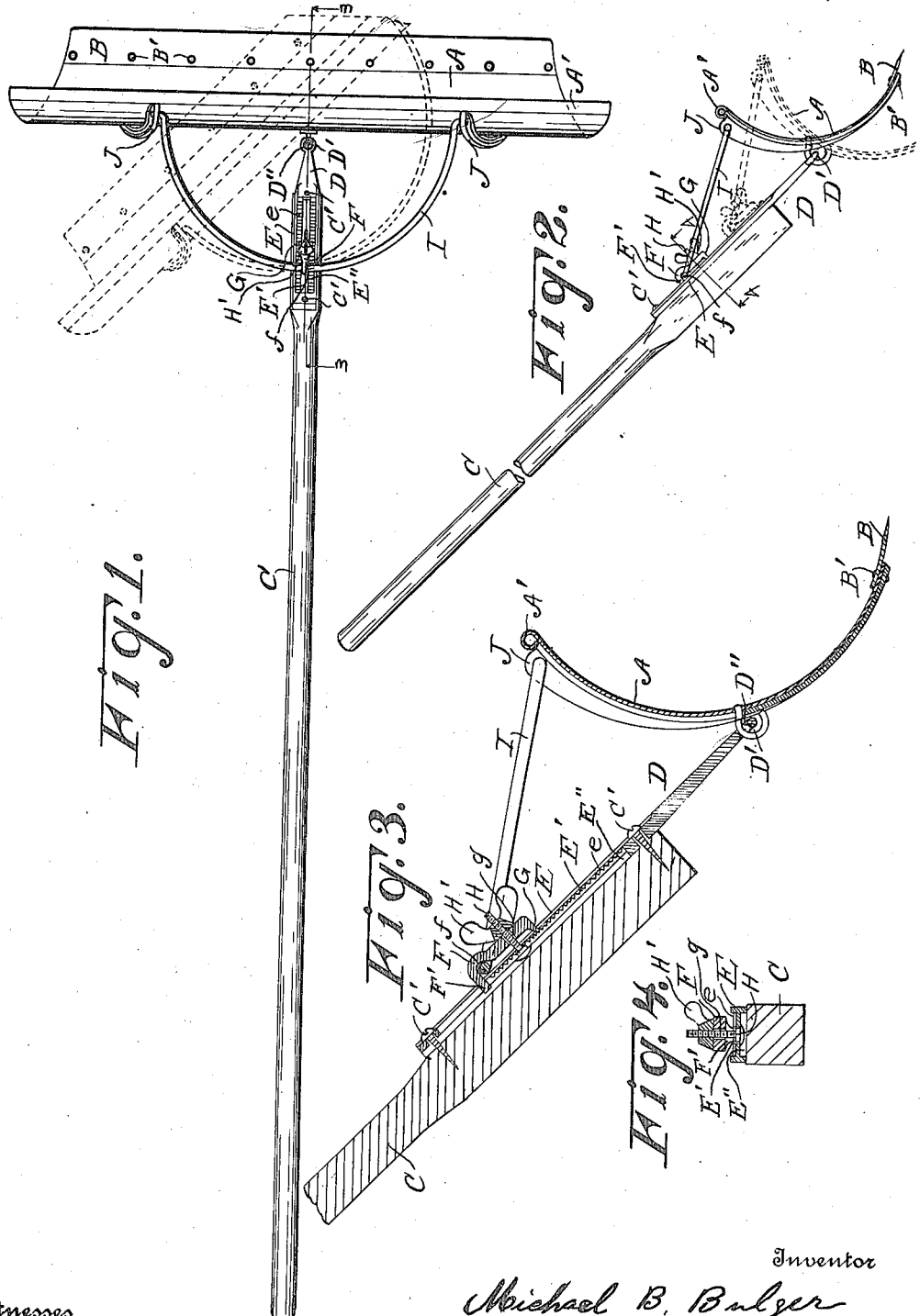

UNITED STATES PATENT OFFICE.

MICHAEL B. BULGER AND JOSEPH P. OFFERMAN, OF BEAVER DAM, WISCONSIN.

SNOW-SCRAPER.

1,196,206.  Specification of Letters Patent.  Patented Aug. 29, 1916.

Application filed May 1, 1916. Serial No. 94,588.

*To all whom it may concern:*

Be it known that we, MICHAEL B. BULGER and JOSEPH P. OFFERMAN, citizens of the United States, residing at Beaver Dam, county of Dodge, and State of Wisconsin, have invented new and useful Improvements in Snow-Scrapers, of which the following is a specification.

Our invention relates to improvements in snow scrapers.

The object of our invention is to provide improved means whereby the scraper may be adjusted not only laterally at various inclinations with reference to the handle, but also vertically whereby the upper margin may be moved forwardly and backwardly with reference to the lower end of the handle in accordance with the requirements under varying conditions.

In the drawings:—Figure 1 is a plan view of a snow scraper embodying our invention with dotted lines indicating an adjustment of the scoop at a lateral inclination, whereby snow or other material may be crowded laterally from the surface of a walk. Fig. 2 is a side elevation of the same with dotted lines indicating the upper margin of the scoop in a forwardly tilted position. Fig. 3 is a sectional view drawn on line 3, 3 of Fig. 1. Fig. 4 is a cross sectional view drawn on line 4, 4 of Fig. 2.

Like parts are identified by the same reference characters throughout the several views.

The scoop comprises a concavo-convex member A preferably formed of sheet metal strengthened at the upper margin by a folded or rolled portion A' and along the lower margin by a blade B, the back of which is riveted at B' to the scoop A, the front edge of which is preferably tapered or sharpened as illustrated. A handle C is provided at its lower end with a longitudinal projecting connecting bar D, which is loosely linked to the back of the scoop A substantially at the middle of the longitudinal center line. An eye hook D' may be employed to facilitate making this connection. The shank of the hook D' is riveted to the scoop, and the hook passes through an eye D'' in the connecting member D. The rear end portion E of the connecting member D is offset from the lower end of the handle C but is secured thereto by screws C'. The portion E is also provided with a longitudinal slot E', the outer surface of the member E being serrated on each side of the slot, as shown at e. A coupling member F has one arm F' loosely interlocked with the portion E of the member D, the portion F' being T-shaped with its shank passing through the slot E' and the head or cross bar engaging underneath the member E in the space E''. This coupling member F is provided at its opposite end with a wedge shaped member G which engages between the teeth e on each side of the slot E''. The clamping bolt H projects through the slot E'. The head of the bolt is in the space E'', and the bolt projects therefrom through the slot and through a hole g in the coupling member F, the threaded outer ends of the bolt being provided with a wing nut H' adapted to bear upon the outer face of the coupling member F, whereby the latter may be securely clamped to the member E.

A curved bail I is pivoted at its respective ends to outwardly projecting ears J formed on the rear face of the scoop A. This bail passes through a recessed portion or notch f formed in the coupling member F, the bail being received between the member F and the member E, as shown. The recess f is of such dimensions that the bail I may be clamped between the members F and E when the wing nut H' is adjusted to clamping position, the recess f being also of sufficient size to prevent the bail from slipping forwardly toward the clamping bolt H from the recess.

When it is desired to adjust the scoop or scraper laterally with reference to the handle it is merely necessary to loosen the wing nut H' sufficiently to allow the bail to slip in the recess f. The bail is curved in an arc described from the point of pivotal connection between the member D and the scoop A, and therefore it is obvious that the bail will slide freely in the recess f to carry either end of the scoop backwardly and the other end forwardly, whereby the scoop may be tilted, as indicated by dotted lines in Fig. 1. But if it is desired to adjust the scoop with a view of bringing the scraper blade B more nearly to either a vertical or horizontal position then the wing nut H' will be sufficiently loosened to allow the coupling member F to be adjusted longitudinally of the slotted member E, that is to say the wing nut H' will be loosened sufficiently to allow the wedge shaped portion G of the member F to lift from between the teeth or serrations $e$, whereupon member F will be permitted to slide along the slot E' to the desired position of adjustment.

With the above described construction the scoop may be operated to scrape light snow from a sidewalk by first swinging it to the dotted line position indicated in Fig. 1, whereby the snow may be pushed from one-half of the walk laterally while the scoop is being moved forwardly along the walk. The snow on the remaining half may be pushed in the opposite direction when returning, or if for any reason it is desired to travel in the same direction the scoop may be adjusted to the opposite angle of inclination. Assuming that the tool is to be used to push snow or other material forwardly in the line of travel then the scoop will be adjusted to the full line position indicated in Fig. 1, or if desired it may be adjusted to the dotted line position indicated in Fig. 2, this position being one in which the blade or scraper B will have its edge in efficient scraping contact with the surface over which the tool travels, and there will be no tendency for the material to slide backwardly and upwardly over the rear margin of the scoop. But assuming that it is desired to use the tool as a shovel it is obvious that the adjustment will ordinarily be that illustrated by full lines in Fig. 2, or one in which the upper margin of the scoop is tilted backwardly to an even greater degree, the scoop, however, being in a position at right angles to the handle.

The upper margin A of the scoop is preferably longer than the lower margin and longer than the scraping blade B, the end margins of the scoop being inclined downwardly and inwardly. The corners of the scraping blade B are also preferably rounded sufficiently to avoid having them catch when crossing joints or crevices in the sidewalk or upon the turf at the edges thereof. The inclined end margins allow the scraper to project laterally from the side-walk and overhang a portion of the ground at the side thereof when the adjacent end of the scraping blade is in contact with the side-walk adjacent to its margin; therefore there will be no tendency for the snow to drop back upon the side-walk after the scraper has passed.

We claim:—

1. A snow scraper comprising a handle, a scoop pivotally connected therewith substantially at the center of its longitudinal median line and provided with a scraping blade along its lower margin, a bail having its ends pivotally connected to the scoop and adjustably connected with the handle, and means for allowing said bail to slide transversely of the handle and also longitudinally thereof for the purpose of adjusting the scoop.

2. A snow scraper comprising the combination with a concavo-convex scoop, a handle pivotally connected to the convex face thereof substantially at the center, a curved bail having its ends pivotally connected with the scoop, a clamping member adapted to connect the middle portion of the bail with the handle, and means for slidably adjusting the clamping member longitudinally of the handle.

3. A snow scraper comprising the combination of a scoop, a handle having a connecting member secured to its lower end and pivotally connected with the rear face of the scoop, a curved bail having its ends pivotally connected with the scoop on opposite sides of the handle, a coupling member adapted to adjustably connect the bail with said connecting member and a clamping bolt adapted to bind the coupling member and connecting member together, said coupling member being adapted to move longitudinally of the connecting member when the clamping bolt is loosened and being also adapted to allow the bail to slide through it transversely of the handle when said bolt is loosened, substantially as described.

4. A snow scraper comprising the combination of a scoop, a handle having a connecting member secured to its lower end and pivotally connected with the rear face of the scoop, a curved bail having its ends pivotally connected with the scoop on opposite sides of the handle, a coupling member adapted to adjustably connect the bail with said connecting member and a clamping bolt adapted to bind the coupling member and connecting member together, said coupling member being adapted to move longitudinally of the connecting member when the clamping bolt is loosened and being also adapted to allow the bail to slide through it transversely of the handle when said bolt is loosened, said coupling member and connecting member being adapted for mutual interlocking engagement, substantially as described.

In testimony whereof we affix our signatures in the presence of two witnesses.

MICHAEL B. BULGER.
JOSEPH P. OFFERMAN.

Witnesses:
JOHN C. HEALY,
JOHN TRACY.